United States Patent [19]

Kefer et al.

[11] Patent Number: 4,829,831
[45] Date of Patent: May 16, 1989

[54] DEVICE FOR MEASURING FLOW RATE IN A PIPE

[75] Inventors: Volker Kefer, Erlangen; Werner Krätzer, Röttenbach; Franz Reitbacher, München, all of Fed. Rep. of Germany

[73] Assignee: Siemens Aktiengesellschaft, Berlin and Munich, Fed. Rep. of Germany

[21] Appl. No.: 76,299

[22] Filed: Jul. 22, 1987

[30] Foreign Application Priority Data

Jul. 23, 1986 [DE] Fed. Rep. of Germany ....... 3624884

[51] Int. Cl.⁴ .............................................. G01F 15/02
[52] U.S. Cl. .............................. 73/861.02; 73/861.04
[58] Field of Search ........... 73/861.04, 861.03, 861.63, 73/861.02, 155

[56] References Cited

U.S. PATENT DOCUMENTS

| | | | |
|---|---|---|---|
| 2,899,824 | 8/1959 | Adelson | 73/861.63 |
| 2,953,681 | 9/1960 | Frazier | 250/356.1 |
| 3,693,435 | 9/1972 | Cox et al. | 73/861.04 |
| 3,732,406 | 5/1973 | Schlatter | 73/861.03 |
| 3,909,603 | 9/1975 | Nicholas | 364/422 |
| 3,937,445 | 2/1976 | Agosta | 366/341 |
| 4,075,680 | 2/1978 | Shipp, Jr. | 361/285 |
| 4,127,332 | 11/1978 | Thiruvengadam et al. | 366/131 |
| 4,184,771 | 1/1980 | Day | 366/341 |
| 4,377,344 | 3/1983 | Hentschel et al. | 366/341 |

FOREIGN PATENT DOCUMENTS 828730 2/1960 United Kingdom .

*Primary Examiner*—Joseph A. Orsino
*Assistant Examiner*—Kenneth Tso
*Attorney, Agent, or Firm*—Herbert L. Lerner; Laurence A. Greenberg

[57] ABSTRACT

A device for measuring flow rate of a flowing medium in a pipe having a throttling device received therein, and a meter for measuring pressure differential connected to the throttling device, including a measuring device for determining density of the medium being disposed in the flowing medium, the pressure differential meter and the measuring device for determining the density of the medium being connected to an evaluation unit for determining the flow rate from the pressure differential in the flowing medium and the density of the medium, the measuring device for determining the density of the medium being located at a section of the throttling device which has a uniformly smaller diameter than that of the pipe.

7 Claims, 1 Drawing Sheet

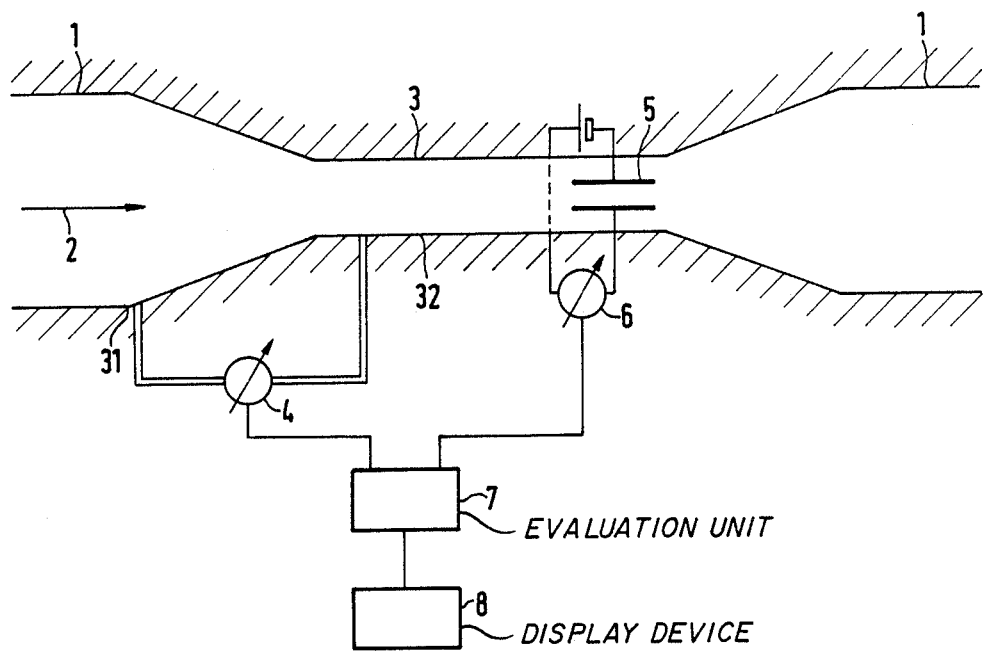

DEVICE FOR MEASURING FLOW RATE IN A PIPE

The invention relates to a device for measuring flow rate of a flowing medium, especially one formed of more than one component or phase, in a pipe in which a throttling device, such as a venturi tube or venturi nozzle, especially, is received and has a pressure differential meter connected thereto. A measuring device for determining the density of the medium is disposed in the flowing medium, and the pressure differential meter and the measuring device for determining the density of the medium are connected to an evaluation unit for determining the flow rate from the pressure difference and the density of the medium.

In various technical fields, an exact knowledge of the flow rate in a pipe is required. Instruments for measuring flow rate are employed, for example, for metering quantities of liquids or gases. They are used for this purpose in the crude oil industry, in process engineering, in the food industry and in other branches of industry. In process engineering, the flow rate is a measured value of importance for monitoring flowing media in pipeline systems. For example, flow rate meters are used in the coolant cycles of power plants and in steam distribution plants. By constant monitoring of the flow rate in a pipe, data regarding energy disposal in coolant cycles or energy distribution in steam distribution systems are obtained. Conventional devices for measuring flow rate have a venturi tube inserted in the pipe. The diameter of a conventional venturi tube first decreases in the direction of flow, then remains constant over a predetermined length and finally increases again. A pressure differential meter is disposed between the inlet cross section of the venturi tube and the section thereof having a small diameter, i.e. the throat of the venturi tube. The pressure difference determined there is proportional to the square of the flow rate. It is also inversely proportional to the mean density of the medium in the measuring region. Thus, $$\Delta p = K \times M^2 / \rho,$$

wherein $\Delta p$ is the pressure difference, $M$ is the flow rate, $\Delta$ is the mean density of the medium and $K$ is a proportional constant to be determined by calibrated measurements.

The flow rate can be determined from the measurement of the pressure difference alone if the mean density of the flowing medium is known, such as for water, for example. To determine the density in multi-phase or multi-component flows, it is customary to dispose in the flowing medium a measuring device for determining the density of the medium. The measuring signals of this measuring device and the measuring signals of the pressure differential meter are fed to an evaluation unit which continuously determines the flow rate therefrom.

Conventional devices for measuring the flow rate in a pipe fail if the flow in the pipe becomes greatly inhomogeneous, because the medium density in the pipe then exhibits very severe local differences. Often, inhomogeneous mixtures of liquids and gases, for example, water-steam mixtures, are transported in or conducted through pipes in engineering plants. Also, inhomogeneous mixtures of different substances, such as oil and water, are transported or conducted through pipes, for example, in the handling of crude oil. The blending of water and steam or water and oil, for example, in the pipeline is often so incomplete that the measured values vary time-dependently between the extreme values, the densities of water and steam and water and oil, respectively.

Because the density of an inhomogeneous medium can be determined only insufficiently with conventional devices, the measurement of the flow rate of an inhomogeneous medium in a pipe therefore is subject to an intolerable error due to the physical linkage between the flow rate and the density.

It is accordingly an object of the invention to provide a device for measuring flow rate which, disposed in a pipe, provides exact values for the flow rate even with inhomogeneous flowing media of unknown density. It is a further object of the invention to provide such a device which determines the flow rate of a mixture of several phases, such as water and steam, of several components, such as water and oil, or other inhomogeneous mixtures.

With the foregoing and other objects in view, there is provided, in accordance with the invention, a device for measuring flow rate of a flowing medium in a pipe having a throttling device received therein, and a meter for measuring pressure differential connected to the throttling device, comprising a measuring device for determining density of the medium being disposed in the flowing medium, the pressure differential meter and the measuring device for determining the density of the medium being connected to an evaluation unit for determining the flow rate from the pressure differential in the flowing medium and the density of the medium, the measuring device for determining the density of the medium being located at a section of the throttling device which has a uniformly smaller diameter than that of the pipe.

In accordance with another feature of the invention, the throttling device is a venturi tube.

In accordance with a further feature of the invention, the throttling device is a venturi nozzle.

In accordance with an added feature of the invention, at least part of the density measuring device is disposed in the throttling device.

In yet another feature of the invention, at least part of the density measuring device is disposed on the throttling device.

Because of the construction of the throttling device which is, for example, a venturi tube, turbulence of the flowing medium occurs in the section at which the diameter of the throttling device decreases in the flow direction. This turbulence has been shown by tests to be so great that, in the section of the throttling device having a constant small diameter, homogeneous flow takes place, in most cases. Homogeneity is even achieved if two liquids of differing density and having a pronounced separation layer flow on top of one another upstream of the throttling device.

Because the measuring device for determining the density of the medium is disposed in the narrowed or choked section, i.e. the throat of the throttling device, in accordance with the invention, and thus in the always homogeneous flow, exact measured values for the density of the medium are obtained which then, together with the pressure difference values, provide exact flow rate values.

The device of the invention provides the advantage that the flow rate of an inhomogeneous multi-component or multi-phase flow can be determined with a great degree of accuracy and great reproducibility. Evaluation of the measured values in the evaluation unit occurs in accordance with an especially simple pattern or model because of the great homogeneity of the flow. In addition, a compact construction of the entire device results from suitably arranging the measuring device for determining the density of the medium in accordance with the invention. Because the measuring device is integrated with the throttling device, for example, a venturi tube, only one component has to be inserted into a pipeline. Therefore, the device for measuring flow rate is easily operable by the user. Furthermore, the measuring device in its entirety can be readily and exactly calibrated.

In accordance with yet another feature of the invention, the measuring device for determining the density of the medium is a capacitor connected to a capacitance meter.

The measuring device for determining the density of the medium is, for example, a gamma densitometer or a capacitance probe. In the latter case, a condenser or capacitor is disposed, as a rule, in the throat of the throttling device. The capacitance of the condenser depends upon the dielectric thereof. Therefore, a simple measurement of the capacitance at the condenser, the composition of the materials of the flowing medium being known, results in data concerning the density of the medium in the condenser or capacitor. By means of the condenser, the density of the medium homogeneously flowing through the throat of the throttling device can be reliably determined in a relatively simple manner.

In accordance with yet an additional feature of the invention, the capacitor is coated with an insulating material.

The device according to the invention can therefore also be used with electrically conductive flowing media. Because of the insulating coating, a short circuit in the condenser or capacitor is impossible. Furthermore, the condenser or capacitor is protected from corrosive media by the coating. With a coated condenser or capacitor, the device according to the invention can be used even with media having high electrical conductivity or corrosive properties.

The invention provides an easily operable and compact flow rate meter giving reliable measured values in connection with inhomogeneous flows. The device is advantageously used with water-steam or water-oil mixtures, especially, but also with other multi-component or multi-phase flows. Other features which are considered as characteristic for the invention are set forth in the appended claims.

Although the invention is illustrated and described herein as embodied in a device for measuring flow rate in a pipe, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying single figure of the drawing which is a diagrammatic view of a device for measuring the flow rate of an inhomogeneous flowing medium in a pipe.

Referring now to the drawing, there is shown therein an inhomogeneous medium flowing in the direction of an arrow 2 through a pipe 1. In the pipe 1, the flow rate M, i.e. that amount of the medium flowing through a standard or unit cross section per unit of time, is to be determined. For this purpose, a venturi tube 3 is inserted into the pipe 1 as a throttling device. A meter 4 for measuring a difference in pressures is connected between an inlet 31 of the venturi tube 3, as viewed in the direction of flow, and a narrowed throat 32 thereof. A pressure difference $\Delta p$ measured thereby is proportional to the square of the desired flow rate M. The flowing medium has a density $\rho$ which enters into the relationship between the flow rate M and the pressure difference $\Delta p$. The density $\rho$ of the medium in the inhomogeneous flow in the pipe 1 is subject to great local variations so that an exact density measurement is not possible there. In the first half of the venturi tube 3, as viewed in the direction of flow, the medium is accelerated and a homogeneous flow is formed. This occurs even if two components flow in layers or strata in the pipe 1 upstream of the venturi tube 3. Downstream from the venturi tube 3, the homogeneous flow is capable of being separated into layered flow again. In accordance with the invention, a measuring device for determining the density $\rho$ of the flowing medium is disposed in the region of homogeneous flow, i.e. in the second or downstream half of the throat 32 of the venturi tube 3. The density $\rho$ measured there has been found, through tests, to be markedly constant, even with an inhomogeneous flow in the pipe 1. The device for measuring the density $\rho$ is a condenser or capacitor 5 which is connected to a capacitance meter 6. The medium flowing homogeneously through the throat 32 of the venturi tube 3 flows through the capacitor 5. The dielectric constant of the medium varies with the density $\rho$ and thus also does the capacitance of the condenser 5. Therefore, the capacitance determined by the capacitance meter 6 is a measure of the density $\rho$ of the medium homogeneously flowing in the capacitor 5. The pressure differential meter 4 and the capacitance meter 6 are connected to a suitable conventional evaluation unit such as a computer 7, which is coupled with a display device 8. The flow rate M in the pipe 1 is determined in the evaluation unit 7 in accordance with the known functional relationship between the pressure difference $\Delta p$ and the density $\rho$ of the medium which is provided by the capacitance of the condenser 5. The venturi tube 3, the condenser or capacitor 5 for determining the density $\rho$, as well as the pressure differential meter 4, the capacitance meter 6, the evaluation unit 7 and the display device 8 are combined into a compact structural unit which is easily operable and relatively easily installable. Due to the arrangement of the condenser or capacitor 5, in accordance with the invention in the rear half of the throat 32 of the venturi tube 3, as viewed in the direction of flow, the flow rate M of a medium flowing inhomogeneously in the pipe 1 upstream of the venturi tube 3 is exactly and dependably determinable.

The foregoing is a description corresponding, in substance, to German application P 36 24 884.3, dated July 23, 1986, international priority of which is being claimed for the instant application and which is hereby made part of this application. Any material discrepancies between the foregoing specification and the specification of the aforementioned corresponding German application are to be resolved in favor of the latter.

We claim:

1. A device for measuring flow rate of a flowing medium in a pipe having a throttling device received therein, and a meter for measuring pressure differential connected to the throttling device, comprising a measuring device for determining density of the medium being disposed in the flowing medium, the pressure differential meter and said measuring device for determining the density of the medium being connected to an evaluation unit for determining the flow rate from the pressure differential in the flowing medium and the density of the medium, said measuring device for determining the density of the medium being located at a section of the throttling device which has a uniformly smaller diameter than that of the pipe.

2. A device according to claim 1, wherein said measuring device for determining the density of the medium is a capacitor connected to a capacitance meter.

3. A device according to claim 2, wherein said capacitor is coated with an insulating material.

4. A device according to claim 1, wherein the throttling device is a venturi tube.

5. A device according to claim 1, wherein the throttling device is a venturi nozzle.

6. A device according to claim 1, wherein at least part of said density measuring device is disposed in the throttling device.

7. A device according to claim 1, wherein at least part of said density measuring device is disposed on the throttling device.

* * * * *